Patented July 20, 1926.

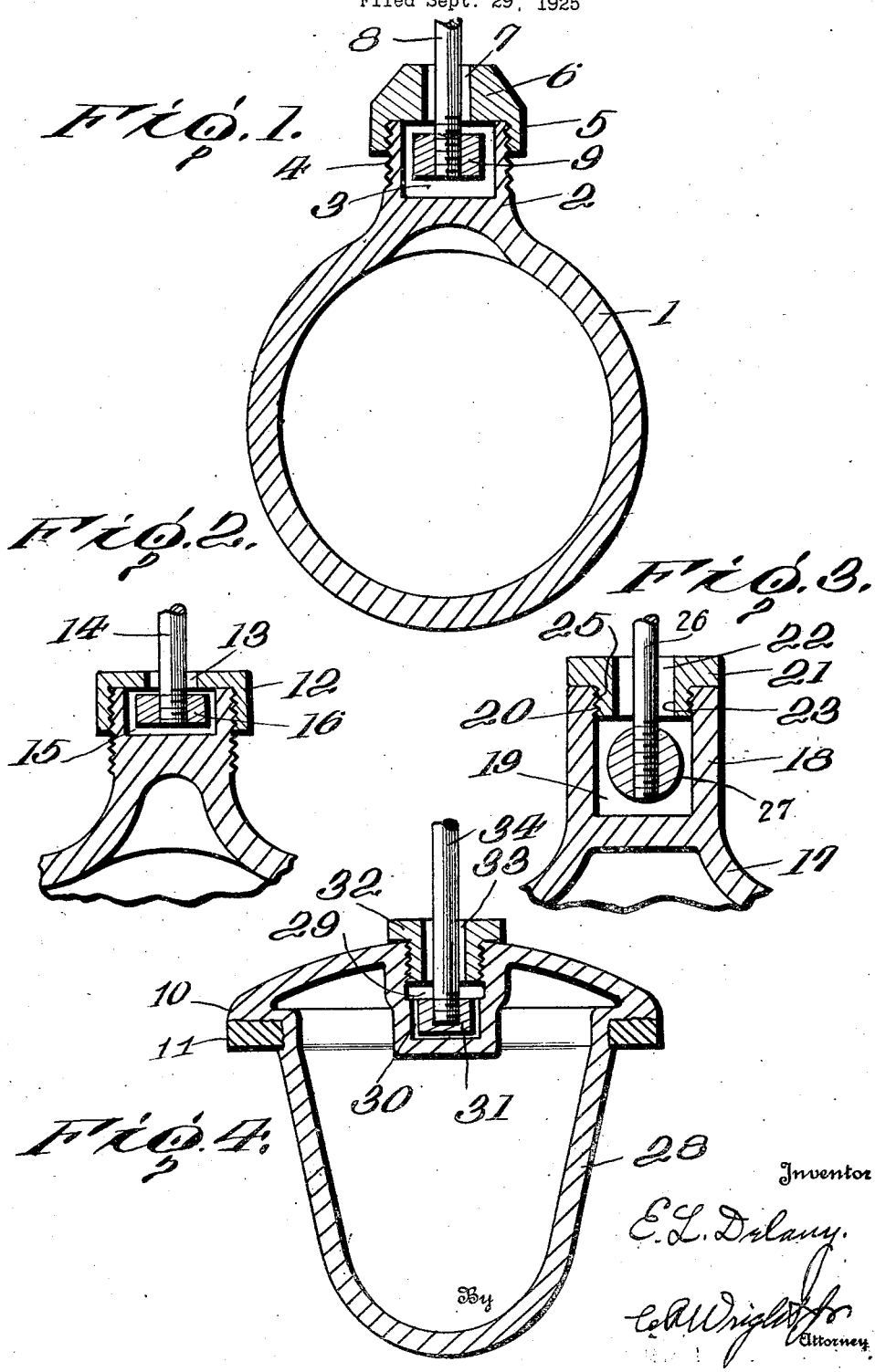

1,593,548

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLUSH-VALVE FLOAT.

Application filed September 29, 1925. Serial No. 59,366.

My invention relates to improvements in flush valve floats.

The object of my invention is to provide a removable universal connection between the lifting rod and the flush valve float, whereby there is a limited universal connection between the same so that the valve will at all times properly seat itself, if the guide through which the rod passes is slightly out of alignment or should the rod become bent at a point below the guide.

Another object of my invention is to provide a flush valve float in which the connection between the lifting rod and the flush valve float can be readily made so that the parts are readily separated or assembled for placing a new flush valve float on the lever or placing a new lifting rod on the flush valve float.

A further object of my invention is to provide a flush valve float in which there is a limited universal movement in the connection between the float and the lifting rod and at the same time provide a simple, cheap and effective flush valve float connection having certain details of structure and combination of parts hereinafter more fully set forth.

In the accompanying drawings:—

Figure 1 is a vertical sectional view of a flush valve float showing the connection with the lifting rod.

Figure 2 is a slightly modified form of Figure 1.

Figure 3 is a vertical sectional view of a still further modified form.

Figure 4 is a vertical sectional view of a still further modified form of flush valve float.

Referring now to the drawings, 1 represents the flush valve float which is preferably made of hard rubber of a hollow form having at its upper end an upwardly extending nipple 2 having a recess 3 extending from its upper end. The upper end of the nipple 2 is externally threaded as indicated at 4 and upon which is screwed the cap 5, which has its upper end thickened as indicated at 6, and provided with an openings 7. Passing downwardly through the opening 7 is a flush valve operating rod 8 which is of a diameter considerably less than the diameter of the opening 7, whereby the lifting rod has a universal limited movement within the opening. The lower end of the rod 8 is screw threaded and upon which is screwed the nut 9 which is of a square form to correspond with the opening 3 in the nipple. This nut, however, is of a size considerably less than the opening so that the same is free to rock within the opening as clearly shown in Figure 1 of the drawings. The body portion below its upper end is provided with an integral flange 10 to the lower face of which is secured a soft rubber gasket 11 to engage the valve seat.

In the modification shown in Figure 2 of the drawings, the thickness of the cap 12 is the same throughout its length, and the opening 13 is of a diameter considerably greater than the lifting rod 14. In this form the recess 15 is of a less depth than the recess 3 of Figure 1, and the nut 16 screwed on the lower end of the lifting rod, and the nut 16 is of a less thickness than the nut 9 in Figure 1. The form shown in Figure 1 gives a broader engaging surface between the cap and the lifting rod 8.

In the modification shown in Figure 3 the flush valve float 17 has the nipple 18 provided with a recess 19 which has its upper end internally threaded as indicated at 20. The cap 21 has an opening 22 therethrough, and is provided with a downwardly extending flange 23, the inner face of which is flush with the opening 22. This flange 23 is externally threaded at 25 and is adapted to screw into threads 20 of the recess 19. The lifting rod 26 passes through the opening 22 into the recess and has a cylinder shaped member 27 screwed thereon which is of a diameter considerably less than that of the recess 19 so that the lifting rod has a limited movement in the opening 22.

From the foregoing description it will be seen that I have provided a simple means, whereby the connection between the flush valve float and the lifting rod may be readily made or broken. In assembling the same in all of the forms, the lifting rod is first passed through the opening in the cap, and the nut screwed thereon and the cap then screwed on the nipple.

In the modification shown in Figure 4, the flush valve 28 is provided with the recess 29 internally threaded and having at its lower end a smaller recess 30, square or of any angular form and into which the member 31 rests. The member 31, as shown, is of a size less than that of the recess 30 so as to have a limited movement therein in all directions. Screwed within the recess 29 is the plug 32 which has an opening 33 of a diameter greater than the lifting rod 34, so that the rod has a limited movement therein. The lower end of the rod is screwed into the member 31, whereby it is held against vertical movement so that the float valve is lifted with the rod 34.

Having thus fully described my invention what I claim is:—

1. A flush valve float comprising a body portion having a recess in its upper end, a member within said recess and held against rotation therein, a cap secured on the flush valve float and covering said recess and a lifting rod passing through the cap and detachably secured to the member within the recess.

2. A flush valve float comprising a body portion having an angular recess in its upper end, an angular member within said recess, a cap secured on the flush valve float and covering said recess, and a lifting rod passing through the cap and detachably secured to the angular member within the recess.

3. A flush valve float comprising a body portion having an angular recess in its upper end, an angular member in said recess, a cap secured on the flush valve float and closing said recess, and having an opening communicating with said recess, and a lifting rod passing through the opening in the cap, and of a diameter less than that of the opening and removably secured to the member in said recess.

4. A flush valve float comprising a body portion having an angular recess in its upper end, an angular member within the recess, a cap secured on the flush valve float and closing said recess, a lifting rod passing through the cap, and having a removable connection with the angular member within the recess, and a soft horizontal seating surface carried by the valve.

5. A flush valve float comprising a body portion having an angular recess in its upper end, an angular member within the recess, a cap secured on the flush valve float and closing said recess, a lifting rod passing through the cap, and removably connected to the angular member within the recess, and a soft horizontal seating surface carried by the float valve adjacent its upper end.

6. A flush valve float comprising a body portion having an angular recess in its upper end, an angular member within the recess and having a threaded opening therein, a cap secured on the flush valve float and having an opening therethrough forming a large bearing surface, and a lifting rod passing through the opening in the cap, and having a threaded lower end adapted to be screwed into the threaded opening in the angular member in the recess.

In testimony whereof, I have signed this specification.

EDWARD L. DELANY.